US010267638B2

(12) United States Patent
Steinhardt et al.

(10) Patent No.: US 10,267,638 B2
(45) Date of Patent: Apr. 23, 2019

(54) METHOD AND SYSTEM FOR ADAPTING A NAVIGATION SYSTEM

(71) Applicant: Continental Teves AG & Co. oHG, Frankfurt (DE)

(72) Inventors: Nico Steinhardt, Frankfurt am Main (DE); Daniel Surek, Ortrand (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 0 days.

(21) Appl. No.: 15/374,325

(22) Filed: Dec. 9, 2016

(65) Prior Publication Data
US 2017/0089705 A1 Mar. 30, 2017

Related U.S. Application Data

(63) Continuation of application No. PCT/EP2015/062790, filed on Jun. 9, 2015.

(51) Int. Cl.
*G01C 21/16* (2006.01)

(52) U.S. Cl.
CPC .................. *G01C 21/165* (2013.01)

(58) Field of Classification Search
USPC ......................................................... 701/501
See application file for complete search history.

(56) References Cited

U.S. PATENT DOCUMENTS 5,054,719 A 10/1991 Maute
6,408,245 B1 6/2002 An et al.
8,494,829 B2 * 7/2013 Teixeira ............... A61B 5/0205
   600/324
9,451,886 B2 * 9/2016 Teixeira ............... A61B 5/0205
2002/0158796 A1 10/2002 Humphrey
2004/0216000 A1 10/2004 Koehler
2005/0240347 A1 4/2005 Yang
(Continued)

FOREIGN PATENT DOCUMENTS

DE       10135586 A1    2/2003
DE    102010063984 A1    8/2011
(Continued)

OTHER PUBLICATIONS

International Search Report and Written Opinion dated Sep. 9, 2015 from corresponding International Patent Application No. PCT/EP2015/062790.
(Continued)

*Primary Examiner* — Tyler D Paige

(57) ABSTRACT

A navigation system comprises a base system and at least one correction system. The base system and the at least one correction system each capture measured values. The measured values describe navigation data, and are each burdened with error values. The error values describe discrepancies in the measured values from the described navigation data. At least the error values of the measured values of the base system are recognized by the measured values of the at least one correction system and wherein the recognition is effected by considering an availability of the at least one correction system. The consideration represents adaptation of parameters of a stochastic system model. The stochastic system model prescribes a weighting for measured values of the at least one correction system with respect to measured values of the base system in accordance with the parameters.

17 Claims, 2 Drawing Sheets

(56) References Cited

U.S. PATENT DOCUMENTS

| | | | | |
|---|---|---|---|---|
| 2006/0074558 A1* | 4/2006 | Williamson | ......... | G01C 21/165 |
| | | | | 701/469 |
| 2006/0149473 A1* | 7/2006 | Krings | ................... | G01C 19/72 |
| | | | | 701/472 |
| 2011/0238307 A1* | 9/2011 | Psiaki | .................... | G01C 21/28 |
| | | | | 701/469 |
| 2011/0257927 A1* | 10/2011 | Bharadwaj | ........... | G01C 21/165 |
| | | | | 702/150 |
| 2011/0287778 A1* | 11/2011 | Levin | ................... | G01S 5/0252 |
| | | | | 455/456.1 |
| 2012/0303221 A1 | 11/2012 | Günthner | | |
| 2014/0062781 A1* | 3/2014 | Mathews | ................ | G01S 11/10 |
| | | | | 342/357.64 |
| 2015/0046020 A1 | 2/2015 | Steinhardt | | |

FOREIGN PATENT DOCUMENTS

| | | |
|---|---|---|
| DE | 102012216211 A1 | 3/2013 |
| DE | 102012216215 A1 | 3/2013 |
| DE | 102012216218 A1 | 3/2013 |
| DE | 102012219478 A1 | 4/2013 |
| RU | 2125732 C1 | 1/1999 |
| WO | WO02086533 A2 | 10/2002 |

OTHER PUBLICATIONS

German Search Report dated Dec. 12, 2014 for corresponding German Patent Application No. 10 2014 211 164.1.
Russian Notice to Grant dated Jul. 13, 2018 for corresponding Russian Patent Application 2016147904.

\* cited by examiner

METHOD AND SYSTEM FOR ADAPTING A NAVIGATION SYSTEM

CROSS REFERENCE TO RELATED APPLICATIONS

This U.S. patent application claims the benefit of PCT patent application No. PCT/EP2015/062790, filed Jun. 9, 2015, which claims the benefit of German patent application No. 10 2014 211 164.1, filed Jun. 11, 2014, both of which are hereby incorporated by reference.

TECHNICAL FIELD

The invention relates to a method and system for adapting a navigation system.

BACKGROUND

All measured data does, in principle, contain errors and in many cases the measured data is, additionally, not continuously available. In addition to being dependent on the inherent characteristics of the sensors, the measured data is, furthermore, frequently dependent on environmental conditions. Sensor errors or measurement errors can be subdivided into quasi-stationary components which are constant over a plurality of measurements, e.g. a so-called offset, and statistical components which are random from measurement to measurement, e.g. noise. Whereas the random components cannot in principle be deterministically corrected, quasi-stationary errors can generally be corrected provided that they are observable. Non-correctable, significant errors can normally be at least avoided provided that they are recognizable.

In connection with this, different sensor fusion methods, which are normally also suitable for correcting or filtering measured data from different sensors or sensor systems, are already known in the prior art. Particularly in the automotive sector, special requirements must be taken into account since a plurality of different sensors capture a common environmental situation or a motor vehicle state by means of different measuring principles and describe this environmental situation or this motor vehicle state by means of a plurality of different measured data. The greatest possible resilience to random interference and a recognition and compensation of systematic errors are thus required for a sensor fusion, which can be used in the automotive sector. Similarly, temporal influences on the measured data must be corrected and temporary outages or the unavailability of sensors must be bridged.

DE 10 2012 216 211 A1 describes a method for selecting a satellite, wherein the satellite is a satellite of a global navigation system. Before such a satellite is used to determine the position of a vehicle, the plausibility of the GNSS signals received is verified in different ways. Different redundancies or known relationships are used, in each case, for this verification. Thus, DE 10 2012 216 211 A1 discloses, for instance, determining both the distance between the vehicle and the satellite and the relative speed of the vehicle to the satellite from the signal of a satellite. The distance can, in this case, be determined by means of the transit delay of the signal, while the relative speed can be determined by means of a phase measurement of the signal. Since the distance and the relative speed are interdependent, they can be verified against one another.

Furthermore, the values determined from the signal can be verified against known boundary conditions, since a vehicle usually travels within a particular speed framework. The document also describes how, on receiving multiple signals from different satellites, the distances from multiple satellites are determined and these distances are simultaneously verified with respect to one another by means of trigonometric relationships and the known distance of the satellites. Finally, it is also possible to verify the distance determined from the signal or the speed determined from the signal by means of other sensors, which also allow a determination of the position or speed. If the signals of a satellite cannot be verified, this satellite is not used for determining the position or for determining the speed.

A sensor system comprising a plurality of sensor elements is known from DE 10 2010 063 984 A1. The sensor elements are designed so that they at least partially capture different primary measured quantities and at least partially use different measuring principles. Other measured quantities are then at least partially derived from the primary measured quantity of the sensor elements. Furthermore, the sensor system comprises a signal processing device, an interface device and a plurality of functional devices. The sensor elements and all of the functional devices are connected to the signal processing device. The primary measured quantities therefore provide redundant information which can be compared with one another in the signal processing device or which can support one another. From the comparison of the observables calculated in different ways conclusions can be drawn regarding the reliability and accuracy of the observables. The signal processing device qualifies the accuracy of the observables and provides the observables, together with an indication of the accuracy, via an interface device to various functional devices.

DE 10 2012 219 478 A1 discloses a sensor system for independently evaluating the accuracy of the data of the sensor system. The sensor system is preferably used in motor vehicles and has a plurality of sensor elements which are designed such that they capture at least to some extent different primary measured quantities or use at least to some extent different measurement principles. Furthermore, the sensor system comprises a signal processing device which evaluates the sensor signals at least to some extent collectively and, at the same time, evaluates the information quality of the sensor signals. The signal processing device additionally provides a piece of information about the accuracy of at least one datum of a physical variable, wherein the datum of the physical variable is calculated on the basis of the sensor signals from sensor elements which either directly capture the physical variable, or the physical variable can be calculated from the sensor signals thereof. The piece of information about the accuracy of the datum is then calculated on the basis of sensor information which is available in a redundant manner, directly or indirectly.

However, the generic methods and sensor systems known from the prior art are disadvantageous inasmuch as they do not take account of the availability of the correction measurements depending on the surroundings or situation. Even the total failure of certain systems is frequently ignored. This leads to non-optimum results of the fused and corrected data.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

It is therefore an object of the invention to propose an improved method for correcting navigation data.

A method for adapting a navigation system comprises a base system and at least one correction system, wherein the base system and the at least one correction system each capture measured values. The measured values describe navigation data and are each burdened with error values. The error values describe discrepancies in the measured values from the described navigation data. At least the error values of the measured values of the base system are recognized the measured values of the at least one correction system. The recognition is effected by considering an availability of the at least one correction system. The consideration represents adaptation of parameters of a stochastic system model and the stochastic system model prescribes a weighting for measured values of the at least one correction system with respect to measured values of the base system in accordance with the parameters.

This results in the respective ambient conditions are taken into account and also taken into account are the resulting consequences for capturing the measured values of the different sensor systems, i.e. of the base system and of the at least one correction system. Since the base system and the at least one correction system are preferably based on different methods or physical principles in order to capture measured values, a navigation system according to the invention can therefore always be optimally adapted to the greatest possible extent to the respective acquisition conditions or ambient conditions.

The consideration of the availability of the at least one correction system thereby describes both the acquisition conditions or ambient conditions in accordance with the boundary conditions set by the surroundings for capturing measured values, and intrinsic system errors, system interference and system defects. The availability of the at least one correction system is therefore shaped by both external influences and internal influences.

The acquisition conditions or ambient conditions are e.g. restrictions in the ability to capture the measured values of the base system or of the at least one correction system, for instance a GPS system being shaded from the GPS satellites e.g. when driving through a tunnel or a street canyon. Likewise, a restriction in the ability to capture measured values as defined by the invention exists, if a sensor system partially or completely fails, e.g. due to a defect. Such a partial failure can exist e.g. in an inertial navigation system if, for instance, one of multiple acquisition axes fails.

In addition, the so-called system matrix is not modified in order to adapt the navigation system, but remains constant. Instead, only the so-called system noise matrix is adapted. As a result, the risk of producing a non-consistent state of the navigation system, in particular a non-consistent filter state of a fusion filter of the navigation system is avoided.

Therefore, it is possible to adapt the navigation system to the existing so-called system noise in each case. This is largely independent of the existing so-called measurement noise in each case, which merely describes the quality of the measured values captured by the sensor systems.

The adaptation is effected, in this case, by means of fixed sets of parameters of the stochastic system model, which can gradually be adapted for different situations or availabilities, or which can also be continuously adapted, for example by means of one or more characteristic curves or by means of one or more characteristic fields.

It is envisaged that at least the error values of the measured values of the base system are additionally corrected by means of the measured values of the at least one correction system, wherein the correction is effected by considering the availability of the at least one correction system. This results in the recognition of the error values assumes a specific importance, namely hereinafter, the correction of at least the error values of the measured values of the base system. This improves and specifies the navigation information determined by the navigation system, e.g. a position or a speed. In particular, the error values of the measured values of the at least one correction system are also recognized and corrected, wherein the error values of the measured values of the at least one correction system are particularly preferably recognized and corrected by means of the measured values of the base system or the measured values of an additional correction system. Likewise, however, a recognition and correction of the error values of a suitable stochastic model are also possible and preferred, wherein the model takes account of the individual characteristics of the respective sensor system.

Furthermore, the base system is an inertial navigation system and the at least one correction system is a global satellite navigation system and/or an odometry navigation system. Therefore, the method is particularly well suited for navigation purposes and to navigation systems, preferably in motor vehicles. The navigation system therefore determines, inter alia, the position, in particular the position of a motor vehicle, from the measured values. The global satellite navigation system can be, for example, a so-called GPS navigation system. The odometry navigation system first determines the speed, e.g. by means of the known rolling circumference of the motor vehicle tires, and therefore makes it possible to determine a position by considering the steering angle within the framework of dead reckoning. It is particularly expedient that the satellite navigation system comprises at least two satellite signal receivers. This improves the reliability and accuracy of the satellite navigation system. Using the inertial navigation system as a base system offers the advantage that it has comparatively the highest availability, since it has a comparatively high output rate of the captured measured values and, in addition, operates largely independently of external interference.

The availability of the at least one correction system is determined by means of a self-diagnostic function. This represents a comparatively simple method in order to determine the availability of the at least one correction system. The self-diagnostic function is thereby preferably designed in such a manner that it can identify both internal defects and errors and can determine external interference.

It is expedient that the recognition and/or the correction is/are effected by means of an error state space filter, in particular by an error state space Kalman filter. The error state space filter thereby constitutes a fusion filter for fusing the measured values, in particular for fusing normally distributed measured values. At the same time, the error state space filter preferably estimates or determines the error values at least of the base system. The error values and, possibly, also unknown quantities of the inertial navigation system can then be estimated or determined by means of the at least one correction system. It is therefore a feature of the error state space filter that, instead of the sensor signals or the measured values, error values are simply estimated or determined incrementally and are then corrected. The error values do of course have significantly lower temporal dynamics than the measured values themselves, as a result of which an extensive decoupling of the dynamics of the error state space filter from the characteristics of the base system or of the at least one correction system is achieved.

Another feature of the error state space Kalman filter is that, as a result of applying a correction, the estimated or determined error values are zero following each work cycle of the error state space Kalman filter, as a result of which an otherwise standard prediction step for predicting the error values during the following work cycle is dispensed with, resulting in the reduction of the computational outlay for the error state space Kalman filter.

A system for adapting a navigation system comprises a navigation system having a base system and at least one correction system, wherein the base system and the at least one correction system are each designed to capture measured values, wherein the measured values describe navigation data, wherein the measured values are each burdened with error values, wherein the error values describe discrepancies in the measured values from the described navigation data, wherein the system is designed to perform a recognition at least of the error values of the measured values of the base system by means of the measured values of the at least one correction system and wherein the system is designed to perform the recognition by considering an acquisition state of the at least one correction system, wherein the consideration represents adaptation of parameters of a stochastic system model and wherein the stochastic system model prescribes a weighting for measured values of the at least one correction system with respect to measured values of the base system in accordance with the parameters.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
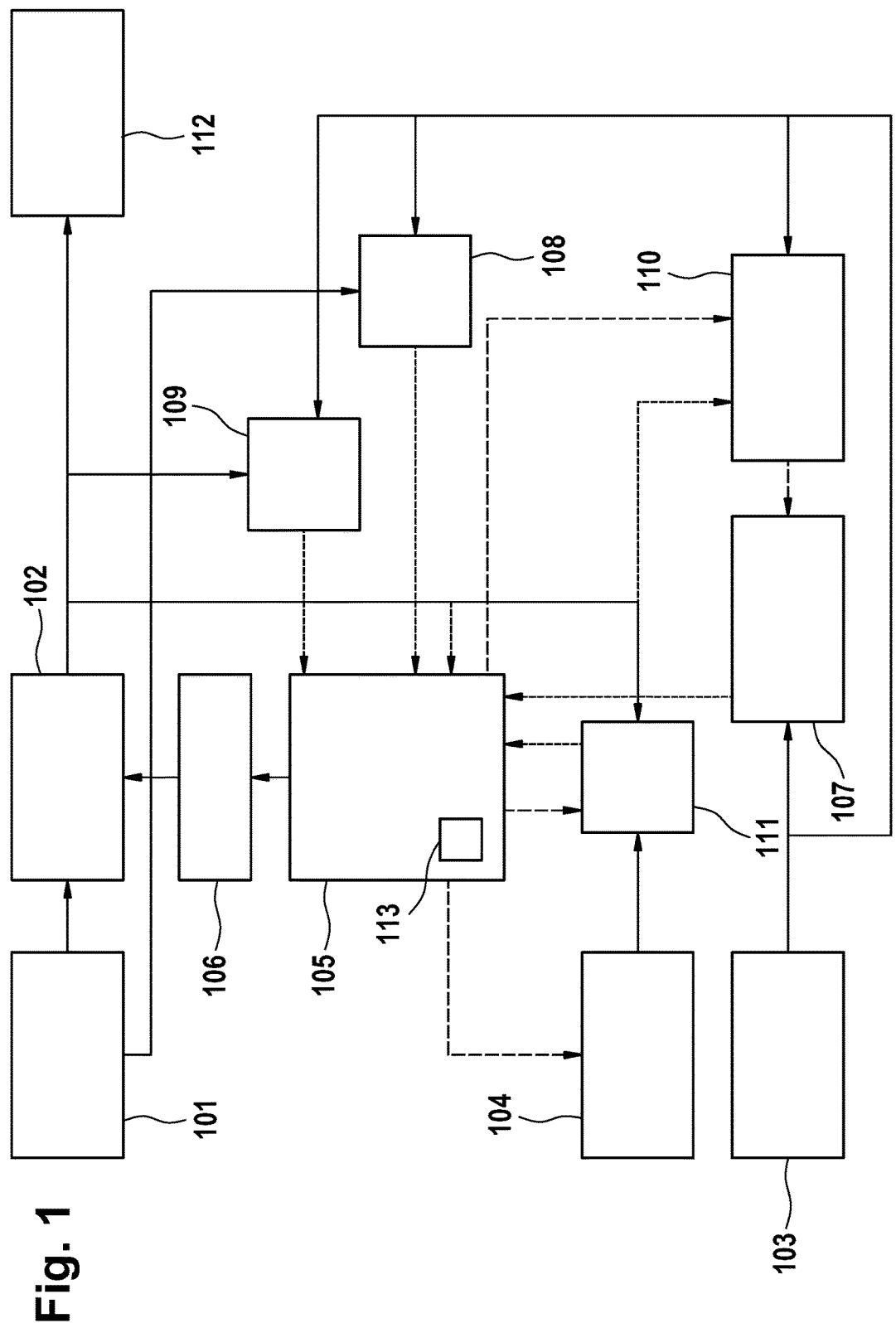
FIG. 1 shows, by way of example, a possible embodiment of a system in a motor vehicle, which is designed to determine a position.

FIG. 1 shows, in schematic representation, an example embodiment of the system which is provided for arrangement and use in a motor vehicle (not shown). All elements and components comprised by the system and the base system and the correction systems respectively are illustrated as function blocks and their interaction with one another is shown.

The navigation system comprises an inertial navigation system 101 which can capture at least the accelerations along a first, a second and a third axis and at least the rotational speeds around the first, around the second and around the third axis. According to the example, the first axis corresponds to the longitudinal axis of the motor vehicle, the second axis corresponds to the transverse axis of the motor vehicle and the third axis corresponds to the vertical axis of the motor vehicle. These three axes form a Cartesian coordinate system, the so-called motor vehicle coordinate system.

According to the example, the inertial navigation system 101 forms the so-called base system, the measured values of which are corrected by means of the so-called correction systems described below. The correction systems are, in this case, the odometry navigation system 103 and the satellite navigation system 104.

The system furthermore has a so-called strapdown algorithm unit 102 in which a so-called strapdown algorithm is run, by means of which the measured values of the inertial sensor navigation system 101 are converted, inter alia, into position data. To do this, the measured values of the inertial sensor navigation system 101 which naturally describe accelerations are integrated twice over time. An alignment of the motor vehicle is also determined by means of double integration of the corresponding measured values of the inertial sensor navigation system 101 over time. Furthermore, the alignment and the speed of the motor vehicle are determined by means of single integration over time. In addition, the strapdown algorithm unit 102 compensates for a Coriolis force acting on the inertial sensor navigation system 101.

The output data of the strapdown algorithm unit 102 consequently has the following physical quantities: the speed, the acceleration and the rotational speed of the motor vehicle, according to the example in relation to the aforementioned three axes of the motor vehicle coordinate system and, according to the example, additionally in each case with reference to a world coordinate system which is suitable for describing the alignment or dynamic quantities of the motor vehicle in the world. According to the example, the aforementioned world coordinate system is a GPS coordinate system.

In addition, the output data of the strapdown algorithm unit 102 comprises the position in relation to the motor vehicle coordinate system and the alignment in relation to the world coordinate system. In addition, the output data of the strapdown algorithm unit 102 has the variances as information on the data quality of the above-mentioned navigation data. These variances, in accordance with the example, are not calculated in the strapdown algorithm unit 102, but are only used and passed on by said strapdown algorithm unit. The aforementioned navigation data calculated by the strapdown algorithm unit 102 is output via the output module 112 and is made available to other motor vehicle systems.

The navigation system furthermore has an odometry navigation system 103 in the form of wheel rotational speed sensors for each wheel of the motor vehicle. According to the example, this involves a four-wheel motor vehicle with four wheel rotational speed sensors which in each case measure the rotational speed of the wheel assigned to them and its direction of rotation. The odometry navigation system 103 furthermore comprises a steering angle sensor element which captures the steering angle of the motor vehicle.

In addition, the navigation system, shown by way of example, has a satellite navigation system 104, which is designed so that it determines the distance in each case between an assigned satellite and the motor vehicle and the speed in each case between the assigned satellite and the motor vehicle.

The system furthermore has a fusion filter 105. During the joint evaluation of the measured data of the odometry navigation system 103, of the satellite navigation system 104 and of the inertial sensor navigation system 101, the fusion filter 105 provides a fusion data set 106. The fusion data set 106 has the measured data captured by the different sensor systems, wherein the fusion data set 106, according to the example, additionally includes error values and variances assigned to the error values, which describe the quality of the data.

The measured values of the inertial sensor navigation system 101 are stored, during the operation of the motor vehicle, for a specified time period in an electronic data memory 113 of the fusion filter 105 provided for this purpose. The inertial navigation system 101 thereby represents the so-called base system, whereas the odometry navigation system 103 and the satellite navigation system 104 represent the so-called correction systems, the measured values of which are used to correct the measured values of the base system. This ensures that values which were at least seemingly captured at exactly the same time can always be compared.

According to the example, the fusion data set 106 provided by the fusion filter 105 comprises the quantitative errors of the base system which have been determined by means of the plausibility-verified measured values of the correction systems. The strapdown algorithm unit 102 then corrects the measured values of the base system by means of the fusion data set 106. The fusion data set 106 is calculated by the fusion filter 105 from the measured values of the odometry navigation system 103, the satellite navigation system 104 and the inertial navigation system 101.

According to the example, the fusion filter 105 is designed as an error state space Kalman filter, i.e. as a Kalman filter which carries out, in particular, a linearization of the measured values and in which the quantitative error values of the measured values are calculated or estimated and which operates sequentially and thereby corrects the measured values available in the respective function step of the sequence.

The fusion filter 105 is designed so that it always captures asynchronously the latest measured values available from the inertial navigation system 101, the odometry navigation system 103 and the satellite navigation system 104. According to the example, the measured values are routed via a motor vehicle model unit 107 and an alignment model unit 109.

The motor vehicle model unit 107 is designed so that it calculates, from the measured values of the odometry navigation system 103, at least the speed along a first axis, the speed along a second axis and the rotational speed around a third axis and supplies these to the fusion filter 105.

The system, in accordance with the example, furthermore includes a tire parameter estimation unit 110 which is designed so that it calculates at least the radius, according to the example the dynamic radius, of all wheels and additionally calculates the cornering stiffness and slip stiffness of all wheels and supplies these to the motor vehicle model unit 107 as additional input quantities. The tire parameter estimation unit 110 is furthermore designed so that it uses a substantially linear tire model to calculate the tire sizes.

The input quantities of the tire parameter estimation unit 110 according to the example are the measured values describing the wheel rotational speeds and the steering angle, at least partially the output values of the strapdown algorithm unit 102 and the variances determined by the fusion filter 105.

The system, in accordance with the example, furthermore may include a GPS error recognition and plausibility verification unit 111 which is designed so that, according to the example, it receives as input data the measured values of the satellite navigation system 104 and, at least partially, measured values from the strapdown algorithm unit 102 and takes them into account in its calculations. The GPS error recognition and plausibility verification unit 111 checks the measured values against a stochastic model which is adapted to the satellite navigation system 104. If the measured values correspond to the model within the framework of a tolerance which takes account of the noise, the plausibility thereof is verified.

The GPS error recognition and plausibility verification unit 111 is additionally connected to the fusion filter 105 at data level and transmits the plausibility-verified, measured values to the fusion filter 105.

The GPS error recognition and plausibility verification unit 111 is designed, for example, so that it carries out a method for selecting a satellite, inter alia, by means of the following: measuring position data of the motor vehicle in relation to the satellite based on the sensor signals from the satellite navigation system 104, determining redundant reference position data of the motor vehicle for the position data determined on the basis of the sensor signals of the satellite navigation system 104, selecting the satellite if a comparison of the position data and the reference position data satisfies a predetermined condition.

For the comparison of the position data and the reference position data, a difference between the position data and the reference position data is formed. The predetermined condition is a maximum permissible deviation of the position data from the reference position data, wherein the maximum permissible deviation is dependent on a standard deviation which is calculated on the basis of a sum of a reference variance for the reference position data and a measured variance for the position data. The maximum permissible deviation corresponds to a multiple of the standard deviation in such a way that a probability that the position data falls in a distribution interval depending on the standard deviation falls below a predetermined threshold value.

According to the example, the system furthermore has a standstill recognition unit 108 which is designed so that it can recognize a standstill of the motor vehicle and, in the case of a recognized standstill of the motor vehicle, provides at least the fusion filter 105 with information from a standstill model. The information from a standstill model describes that the rotational speeds around all three axes have the value zero and the speeds along all three axes have the value zero. According to the example, the standstill recognition unit 108 is designed so that it uses the measured values of the wheel rotational speed sensors from the odometry navigation system 103 and the measured values from the inertial navigation system 101 as input data.

According to the example, the sensor fusion system uses a first group of measured values which relate to a motor vehicle coordinate system and additionally a second group of measured values which relate to a world coordinate system, wherein the world coordinate system is used to describe the alignment and dynamic quantities of the motor vehicle. An alignment angle between the motor vehicle coordinate system and the world coordinate system is determined by means of the alignment model unit 109.

The alignment angle between the motor vehicle coordinate system and the world coordinate system determined by the alignment model unit 109 is determined on the basis of the following quantities: the vectorial speed in relation to the world coordinate system, the vectorial speed in relation to the motor vehicle coordinate system, the steering angle, and the respective quantitative errors of the measured data or values describing the indicated quantities.

The alignment model unit 109 uses all of the output data of the strapdown algorithm unit 102.

According to the example, the alignment model unit 109 is designed so that, in addition to the alignment angle, it also calculates information relating to the data quality of the alignment angle in the form of a variance and supplies this to the fusion filter 105.

The fusion filter 105 uses the alignment angle and the variance of the alignment angle in its calculations, the results of which it forwards via the fusion data set 106 to the strapdown algorithm unit 102.

The fusion filter 105 therefore captures the measured values of the inertial navigation system 101, the base system, and of the odometry navigation system 103 and the satellite navigation system 104, the correction systems.

If there is a change in the availability of at least one of the two correction systems, i.e. of the odometry navigation system 103 or the satellite navigation system 104, this is established by means of a self-diagnostic function. The self-diagnostic function is, in this case, substantially a comparison of the measured values captured at a particular time with other measured values preferably captured at the same time or at a time which is substantially immediately in the proximity thereof. If it is recognized that the odometry navigation system 103 or the satellite navigation system 104 is only available to a limited extent, a set of parameters for the noise matrix which corresponds to the respective availability is loaded into the fusion filter 105, i.e. the parameters of the stochastic system model which describe the noise behavior are adapted accordingly. As a result of this adaptation of the parameters, the measured values of the correction system which is only available to a limited extent are assumed to be burdened with quantitatively greater error values and are less heavily weighted with respect to the measured values of the base system and the measured values of the correction system which is available to an unlimited extent.

Figure 2:
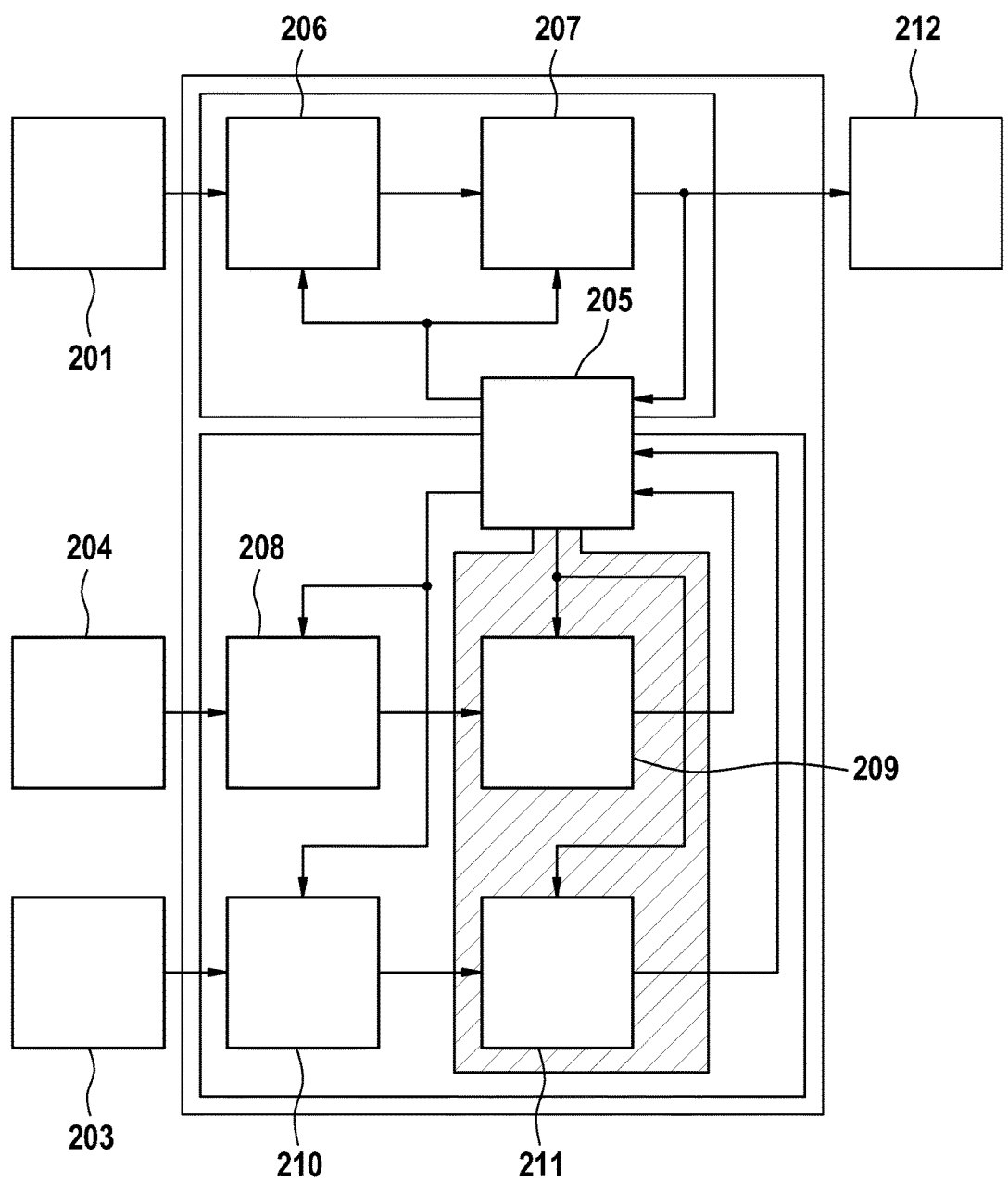
FIG. 2 shows, by way of example, another possible embodiment of a system in a motor vehicle, which is also designed to determine a position.

FIG. 2 shows by way of example a further possible embodiment of a system, which is also designed for adapting a navigation system, in a motor vehicle (not shown). According to the example, the system comprises an inertial navigation system 201, a satellite navigation system 204 and an odometry navigation system 203 as different sensor systems. The inertial navigation system 201, the satellite navigation system 204 and the odometry navigation system 203 each output measured values which describe navigation data, directly or indirectly, namely a position, a speed, an acceleration, an alignment, a yaw rate or a yaw acceleration, to the fusion filter 205. The measured values are output via a vehicle data bus, according to the example via a so-called CAN bus. According to the example, the satellite navigation system 204 outputs its measured data in the form of raw data.

The inertial navigation system 201, which is a so-called MEMS-IMU (M Microelectromechanical System Inertial Measurement Unit), is used as the central element in determining the position of the motor vehicle in combination with the strapdown algorithm unit 207, since said system is assumed to be free of errors, i.e. it is assumed that the values of the inertial navigation system 201 always correspond to their stochastic model, that they merely have noise influences and are therefore free from external or random errors or interference. The noise and the remaining, unmodeled errors of the inertial navigation system 201, e.g. non-linearity, are assumed to be zero-mean, stationary, and normally distributed over the measurement range (so-called Gaussian white noise).

The inertial navigation system 201 comprises three rotational speed sensors which each capture values orthogonally in relation to one another and three acceleration sensors which each capture values orthogonally in relation to one another.

The satellite navigation system 204 comprises a GPS receiver which initially carries out distance measurements for the receivable GPS satellites by means of the satellite signal transit delay and, furthermore, determines a route traveled by the motor vehicle from the change in the satellite signal transit delay and, additionally, from the change in the number of wavelengths of the satellite signals. The odometry navigation system 203 in each case comprises a wheel rotational speed sensor on each wheel of the motor vehicle and a steering angle sensor. The wheel rotational speed sensors each determine the wheel rotational speed of the wheel assigned to them and the steering angle sensor determines the adopted steering angle.

The inertial navigation system 201 outputs its measured values to a preprocessing unit 206 of the inertial sensor navigation system 201. The preprocessing unit 206 then corrects the measured values or the navigation data described therein by means of correction values which the preprocessing unit 206 receives from the fusion filter 205. The measured values or the navigation data described therein corrected in this way is/are then forwarded to the strapdown algorithm unit 207.

The strapdown algorithm unit 207 then carries out a position determination using the corrected measured values from the preprocessing unit 206. This position determination is a so-called dead reckoning based on the inertial navigation system 201. For this purpose, the corrected measured values or the navigation data described therein output by the preprocessing unit 206 is/are continuously integrated or added over time. The strapdown algorithm unit 207 furthermore compensates for a Coriolis force acting on the inertial sensor navigation system 201, which may affect the measured data of the inertial navigation system 201.

In order to determine the position, the captured measured values from the inertial navigation system 201, which naturally describe accelerations, are integrated twice over time by the strapdown algorithm unit 207. This enables an updating of a previously known position and an updating of a previously known alignment of the motor vehicle. In order to determine a speed or a rotational speed of the motor vehicle, a one-off integration of the captured measured values of the inertial sensor navigation system 201 is carried out by the strapdown algorithm unit 207 over time.

Furthermore, the strapdown algorithm unit 207 also corrects the determined position by means of appropriate correction values of the fusion filter 205. In this example, the fusion filter 205 therefore carries out the correction only indirectly via the strapdown algorithm unit 207. The measured values or navigation data determined and corrected by the strapdown algorithm unit 207, i.e. the position, the speed, the acceleration, the alignment, the rotational speed and the rotational acceleration of the motor vehicle are then routed to an output module 212 and to the fusion filter 205.

The so-called strapdown algorithm run by the strapdown algorithm unit 207 is arithmetically simple and can therefore be implemented as a real-time-capable base system. It represents a sequence for integrating the measured values from the inertial navigation system 201 for the speed, alignment and position and contains no filtering, resulting in a more or less constant latency time and group delay.

The 'base system' describes that sensor system, the measured values of which are corrected by the measured values of the other sensor systems, the so-called correction systems. In accordance with the example, the correction systems, as already stated, are the odometry navigation system 203 and the satellite navigation system 204.

According to the example, the inertial navigation system 201, the preprocessing unit 206 of the inertial sensor navigation system 201 and the strapdown algorithm unit 207 together form the so-called base system which, in addition, proportionally also includes the fusion filter 205.

The output module 212 forwards the navigation data determined and corrected by the strapdown algorithm unit 207 to any given further systems of the motor vehicle.

According to the example, the measured values captured by the satellite navigation system 204 are initially forwarded in the form of sensor signals via a so-called UART data link to the preprocessing unit 208 of the satellite navigation system 204. The preprocessing unit 208 then uses the measured values output by the satellite navigation system 204, which measured values represent GPS raw data and which also comprise a description of the orbit of each of the GPS satellites transmitting the GPS signals, to determine a position and a speed of the motor vehicle in the GPS coordinate system.

The satellite navigation system 204 furthermore determines a relative speed of the motor vehicle in relation to the GPS satellites from which GPS signals are received. The preprocessing unit 208 furthermore corrects a time error, contained in the measured values, of a receiver clock of the satellite navigation system 204 which is caused by a drift of the receiver clock and also, by means of a correction model, changes in the signal transit delay and in the signal path caused by atmospheric effects on the GPS signals transmitted by the GPS satellites. The time error and the atmospheric effects are corrected by means of correction values received from the fusion filter 205 via the CAN bus.

A plausibility verification module 209 which verifies the plausibility of measured values of the navigation data output by the preprocessing unit 208, i.e. the position and speed of the motor vehicle, is furthermore assigned to the satellite navigation system 204. The measured values verified by the plausibility verification module 209 are then output to the fusion filter 205.

The system furthermore may include a preprocessing unit 210 of the odometry navigation system 203 which receives the measured values captured by the odometry navigation system 203 via the CAN bus. In this case, the captured measured values are the measured values of the individual wheel rotational speed sensors and the measured values of the steering angle sensor. From the measured values output by the odometry navigation system 203, the preprocessing unit 210 then determines the position and alignment of the motor vehicle in the motor vehicle coordinate system according to a so-called dead reckoning method. Furthermore, the speed, the acceleration, the rotational speed and the rotational acceleration of the motor vehicle are determined, also in the motor vehicle coordinate system. The preprocessing unit 210 furthermore corrects the measured values received from the odometry navigation system 203 by means of correction values received from the fusion filter 205.

Furthermore, a plausibility verification module 211 which verifies the plausibility of the measured values, i.e. the position, the alignment, the speed, the acceleration, the rotational speed and the rotational acceleration of the motor vehicle, output by the preprocessing unit 210, is assigned to the odometry navigation system 203. Since the interference of the measured values from the odometry navigation system 203 is frequently random, environmental interference which does not correspond to white noise, e.g. in the case of a comparatively substantial wheel slip, the measured values determined by means of the inertial navigation system 201 and by means of the satellite navigation system 204 are used in order to verify the plausibility of the measured values of the odometry navigation system 203. Here again, the measured values are first compared against a model for a specific sensor which is assigned to them and which takes account of measurement uncertainties such as noise influences. If the measured values correspond to the model within the set boundary values or tolerance ranges, this represents a first verification of the plausibility thereof and the values which have been plausibility-verified in this way are further processed. The plausibility-verified values are then forwarded to the fusion filter 205. If the plausibility of these measured values cannot be verified, the corresponding measured values are rejected and are not further processed.

According to the example, the fusion filter 205 is designed as an error state space Kalman filter. According to the example, the main task of the fusion filter 205 is to correct the measured values of the base system, i.e. of the inertial navigation system 201, by means of measured values from the odometry navigation system 203 and the satellite navigation system 204, which represent the correction systems, or to output appropriate correction values to the strapdown algorithm unit 207. Since the inertial navigation system 201 in accordance with the example is assumed to be free of random errors and external interference, the measured values of the inertial navigation system 201 are exclusively subject to white noise.

Since the fusion filter 205 is a so-called error state space Kalman filter, only the quantitative error values of the measured values are determined and suitable corrections are made. This simplifies and speeds up the fusion, carried out by the fusion filter 205, of the measured values from the inertial navigation system 201, the odometry navigation system 203 and the satellite navigation system 204 into a common fusion data set. This makes possible a real time-capable position determination and correction of the position determination.

The system shown in FIG. 2 represents a so-called virtual sensor, wherein the inertial navigation system 201, the odometry navigation system 203 and the satellite navigation system 204 are not, however, components of the virtual sensor. A virtual sensor is a system which always generates the same output data or outputs irrespective of the type of the incorporated sensor systems, i.e. in this case the inertial navigation system 201, the odometry navigation system 203 and the satellite navigation system 204. From the output data or outputs it is not evident which sensor systems are incorporated into the system.

In the event of a change in the availability of a correction system, according to the example of a satellite navigation system 204, a change is made to the parameters of a stochastic system model, namely of the so-called noise matrix of the system, by means of which the changed availability of the satellite navigation system 204 is considered. The change in the availability of the satellite navigation system 204 is effected, in accordance with the example, as a result of the motor vehicle driving through a tunnel so that the satellite navigation system 204 is no longer able to receive signals of the associated navigation satellites. This fact is recognized, on the one hand, by means of a self-diagnostic function of the satellite navigation system 204 and is indicated to fusion filters 205 and, on the other hand, by means of a digital road map which is provided in the navigation system and is also indicated to the fusion filter 205. The system then loads a set of parameters for weighting the different measured values, said set of parameters being specially adapted to driving through a tunnel, from a digital memory.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A method for adapting a navigation system for a vehicle comprising:
    capturing measured values of navigation data with a controller for the navigation system from each of a base system and from at least one correction system, wherein the measured values include error values which describe discrepancies of the measured values from the navigation data;
    recognizing the error values of the measured values of the at least one correction system based on the availability of the at least one correction system;
    considering an availability of the at least one correction system by comparison of measured values captured at a particular time with other measured values captured at one of the same time and at a time which is substantially immediately in the proximity thereof; and
    adapting parameters of a stochastic system model for the consideration, wherein the stochastic system model prescribes a weighting for measured values of the at least one correction system with respect to measured values of the base system in accordance with the parameters; and
    wherein the base system is an inertial navigation system for the vehicle and the at least one correction system is one of a global satellite navigation system for the vehicle and an odometry navigation system for the vehicle.

2. The method according to claim 1, further comprising correcting at least of the error values of the measured values of the base system with the measured values of the at least one correction system, wherein the correcting is effected by considering the availability of the at least one correction system.

3. The method according to claim 1, further comprising determining the availability of the at least one correction system by a self-diagnostic function.

4. The method according to claim 1, wherein at least one of the recognizing and the correcting includes using an error state space filter.

5. The method according to claim 4, wherein the error state space filter is a Kalman filter.

6. The method according to claim 1, wherein the base system and the at least one correction system are based on different methods to capture the measured values.

7. The method according to claim 1, wherein the odometry navigation system further comprises at least a plurality of wheel speed sensors and a steering angle sensor.

8. The method according to claim 1, wherein the inertial navigation system is a microelectromechanical system inertial measurement unit.

9. The method according to claim 1, wherein the satellite navigation system is a receiver for a global positioning system.

10. A navigation system for use in a vehicle, comprising:
    a base system, in the form of an inertial navigation system, which receives data from at least one vehicle sensor;
    at least one correction system, wherein the base system and the at least one correction system capture measured values, which include error values, which describe discrepancies of the measured values from the navigation data and wherein the at least one correction system is one of a global satellite navigation system for the vehicle and an odometry navigation system for the vehicle;
    a controller for the navigation system with instructions for:
        recognizing the error values of the measured values of the at least one correction system based on the availability of the at least one correction system;
        considering an availability of the at least one correction system by comparison of measured values captured at a particular time with other measured values captured at one of the same time and at a time which is substantially immediately in the proximity thereof; and
        adapting parameters of a stochastic system model for the consideration, wherein the stochastic system model prescribes a weighting for measured values of the at least one correction system with respect to measured values of the base system in accordance with the parameters.

11. The system according to claim 10, wherein the system is in a motor vehicle.

12. The system according to claim 10, wherein a correction at least of the error values of the measured values of the base system is effected by the measured values of the at least one correction system and by considering the availability of the at least one correction system.

13. The system according to claim 10, wherein the availability of the at least one correction system is determined by a self-diagnostic function.

14. The system according to claim 10, wherein an error state space filter is used to perform at least one of the recognizing and the correcting.

15. The system according to claim 14, wherein the error state space filter is a Kalman filter.

16. The system according to claim 10, wherein the base system is an inertial navigation system, which receives data from at least one vehicle sensor.

17. The system according to claim 10, wherein the odometry navigation system further comprises at least a plurality of wheel speed sensors and a steering angle sensor.

* * * * *